UNITED STATES PATENT OFFICE.

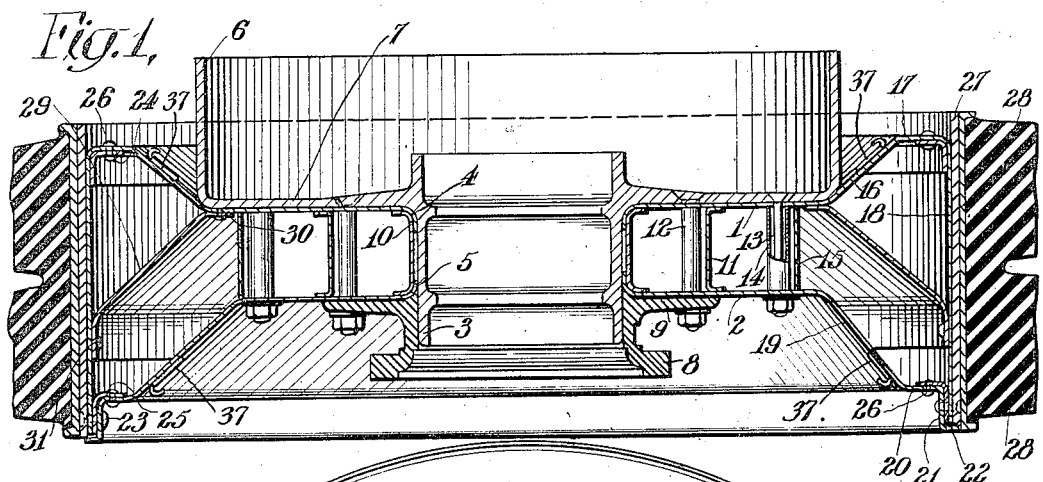
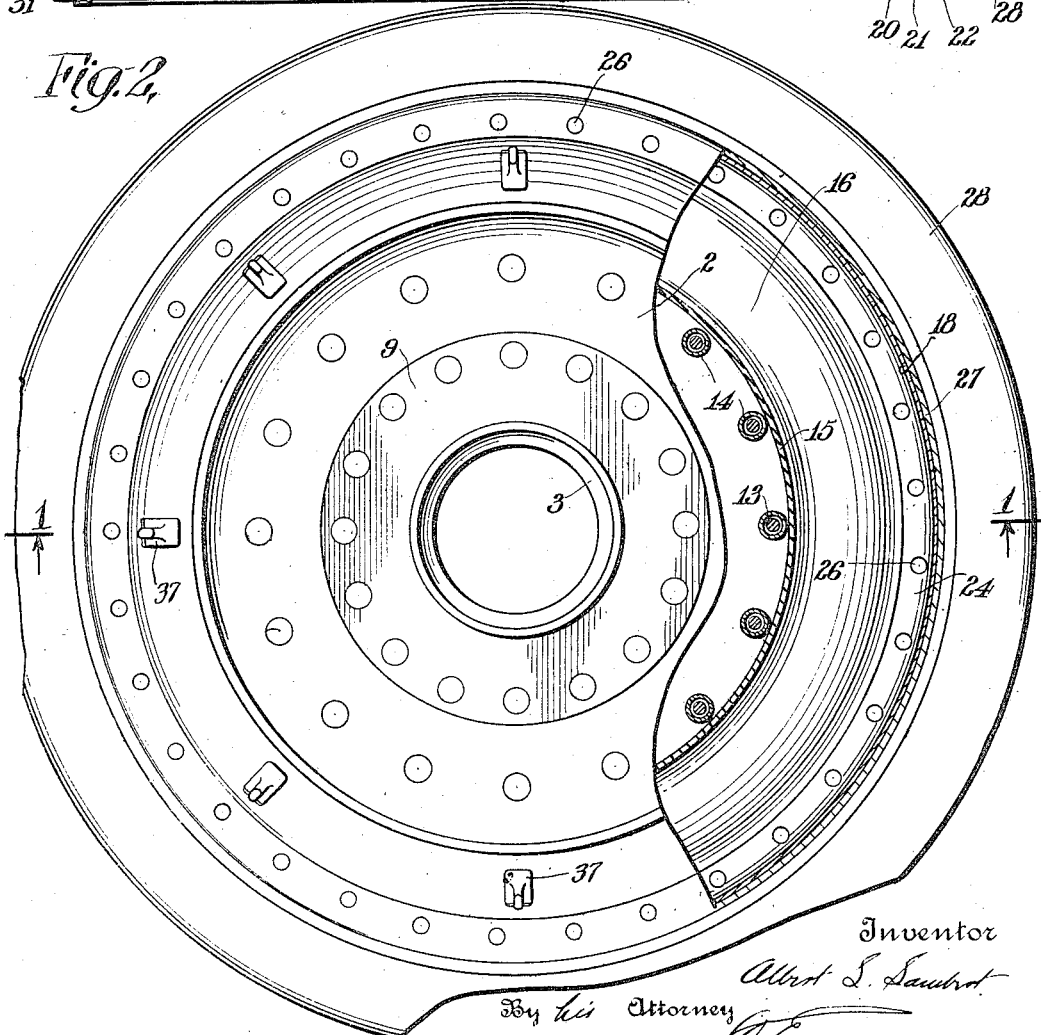

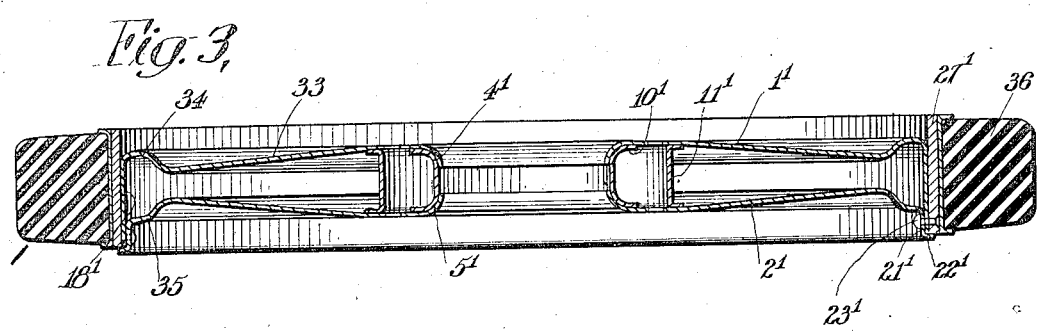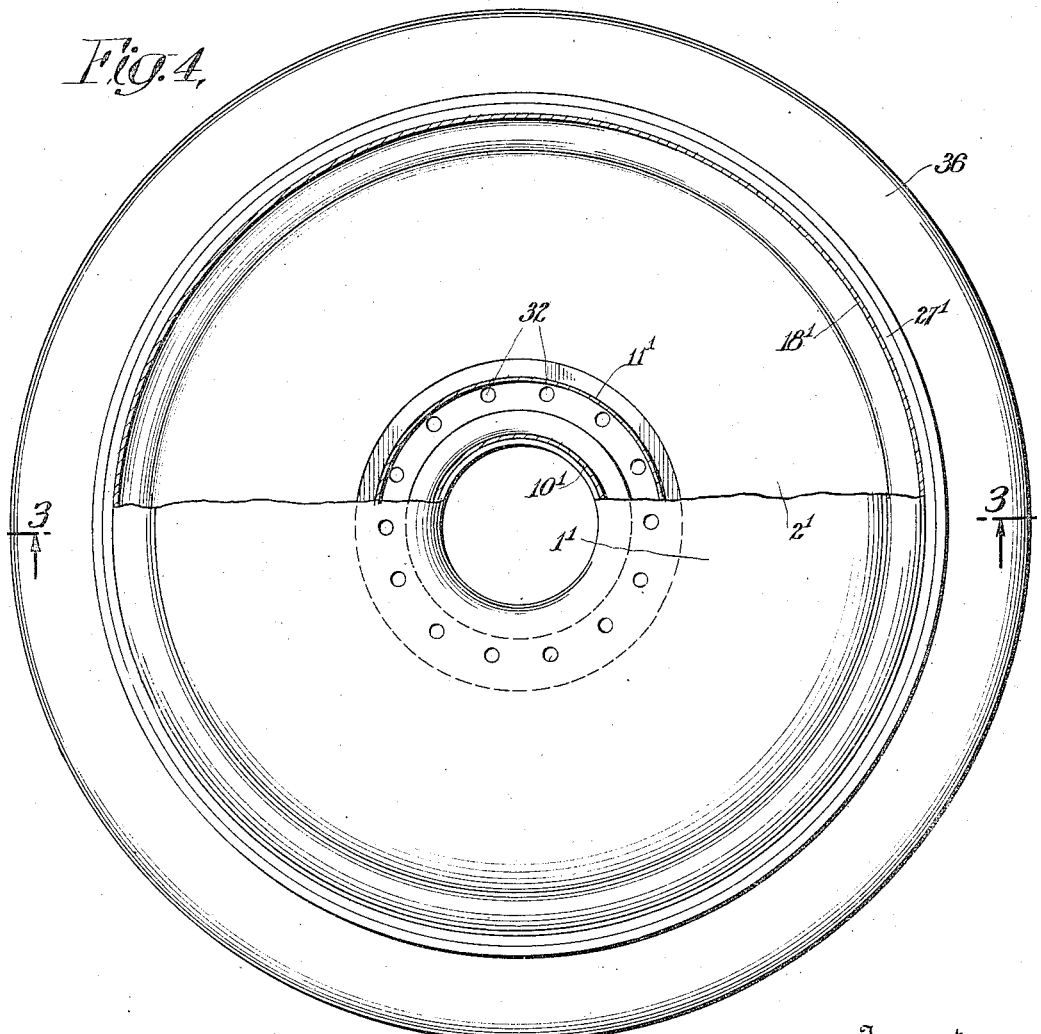

ALBERT LESLIE LAMBERT, OF NARBERTH, PENNSYLVANIA, ASSIGNOR TO HALE & KILBURN CORPORATION, OF PHILADELPHIA, PENNSYLVANIA, A CORPORATION OF DELAWARE.

PRESSED-METAL WHEEL.

1,323,776.   Specification of Letters Patent.   Patented Dec. 2, 1919.

Application filed February 3, 1919. Serial No. 274,612.

*To all whom it may concern:*

Be it known that I, ALBERT LESLIE LAMBERT, a citizen of the United States, residing at Narberth, county of Montgomery, State of Pennsylvania, have invented certain new and useful Improvements in Pressed-Metal Wheels, of which the following is a specification.

My invention relates to wheels which are formed of pressed steel or other suitable metal and are adapted particularly for heavy trucks. The construction is adapted for the front wheels of the truck, and the same general construction, with various additional features which are designed to stiffen and strengthen the construction, for the rear wheels. Generally speaking, the construction embodies a pair of pressed steel disks which are formed to be mounted about a suitable hub to which they are secured by bolts extending through substantially parallel flanges of the hub and the adjacent portions of the disks. The metal of the disks adjacent the central openings therein is pressed inwardly to engage the hub construction and curved channel reinforcements are positioned between the disks adjacent the curved inner flanges referred to, to act as spacers and to prevent the disks being crushed when the flange bolts are drawn up tight. One of the disks is pressed outwardly adjacent its edge and then is bent into parallelism to the axis of the construction to form a rim flange. The other disk is similarly dished at its outer edge portion and is then bent outwardly in the same direction as the rim flange of the first disk into parallel contacting relation with the edge portion of the rim flange of the first disk to which it is secured. The felly band is shrunk on the rim flange thus formed to which it is held partly by friction and partly, if desired, by the use of rivets. It will be noted that the construction is so formed that driving or braking forces are transmitted from the hub bolts to the felly band without the necessity for the same being carried through any joints in the wheel construction. The rear wheel is intended for carrying dual tires and has the same general construction as that just described. Because of the added load, however, various features are added thereto. The main disks referred to are so arranged that the bulk of the load from both tires is transmitted to the inner disk which in turn is usually supported by the large brake-drum. Reinforcing angles are supplied on the inner corners of the wheel rim. Bolts are extended through the disks in the same manner as is done in the case of the front wheel and an additional series of bolts in an outer circle, each of which is surrounded by a section of pipe or the like to act as a spacer. This row of bolts is encircled by a flat strip of metal arranged in a circle between the two disks, this being primarily for the purpose of transmitting radial forces from the outside tire to the inner disk so as to aid in preventing collapse of the outer disk. Both wheels are designed in such a manner that they may be placed on any hub of corresponding size which previously carried a wooden spoke wheel.

The objects of my invention are to provide improved features of construction in wheels of the character briefly described above.

In order that a clearer understanding of my invention may be had attention is hereby directed to the accompanying drawings forming part of this application and illustrating certain embodiments of my invention.

In the drawings Figure 1 represents a cross-section taken on line 1—1 of Fig. 2, Fig. 2 is a side elevation of a wheel designed for use as a rear wheel, certain parts being shown broken away, Fig. 3 is a cross-section taken on line 3—3 of Fig. 4 and Fig. 4 is a side elevation of a wheel designed for use as a front wheel of a truck, certain parts being shown broken away.

Referring first to Figs. 1 and 2 of the drawings the two main disks 1 and 2 are of pressed steel or other suitable metal. These disks are cut away at the center so as to fit about the hub 3 of any usual construction. The inner portions of the disks are curved inwardly to fit about the hub as is indicated at 4 and 5, the hub portions of the pressed metal frame thus formed being in alinement with each other about the hub 3, there preferably being a space between the adjacent ends of the portions 4 and 5 for the sake of lightness. The large brake-drum 6 is shown as secured to or integral with the hub 3, the brake-drum having an annular web 7 at right angles to the axis of the wheel. The inner disk 1 rests in contact with this brake-drum web 7 throughout the extent of the latter. On the opposite or outer side of the wheel a member 8 is secured about the hub 3 having a comparatively short annular flange 9 which is parallel to the web 7 of the brake-drum and against which the inner portion of the outer disk 2 rests in engagement.

The curved channel reinforcement 10 is provided, this channel resting against and being secured to the hub portions 4 and 5 of the disks 1 and 2, surrounding the axial portion of the hub 3. This channel member may be welded or otherwise suitably secured to the hub portions 4 and 5 of the disks, and serves as a spacer and reinforcement between the disks at this point. Some distance away from the hub 3, radially of the wheel and preferably adjacent the outer edge of the hub flange 9, another channel member 11 is positioned between the disks as a spacing and reinforcing member, this member extending in a circle around the hub and being suitably secured to the disks 1 and 2, preferably by welding. Between the reinforcements 10 and 11 and preferably adjacent to the latter a series of bolts 12 are extended through the flange 9 and the disks 1 and 2 and into the web 7 of the brake-drum, these bolts preferably having heads which are countersunk in the web 7 of the brake-drum. When these bolts 12 are drawn up tight crushing of the disks 1 and 2 will be prevented by the reinforcements 10 and 11.

In the construction illustrated an outer circular series of bolts 13 are extended through the disks 1 and 2, the heads of the bolts being countersunk in the web 7 of the brake-drum. In my preferred construction each of these bolts 13 is surrounded by a cylindrical spacing member, preferably a section of metal pipe 14, the ends of which engage the inner surfaces of the disks 1 and 2. Preferably also a flat strip of metal 15 extends in circular arrangement around the wheel, between the disks 1 and 2, and immediately outside of the pipe spacers 14. This circular strip 15 is preferably welded at its edges to the disks 1 and 2, the ends of the pipes or spacers 14 also preferably being welded to the disks 1 and 2.

The disks 1 and 2 are mounted in parallel relation by the devices described, from the hub to a point outside the circular spacer 15, and preferably for a distance radially of the wheel, just beyond the outer edge of the brake-drum 6. From this point the disk 1 is carried inwardly on a slant for a distance as is indicated at 16, the disk again extending in a direction normal to the axis of the wheel for a distance as indicated at 17. From this point the disk 1 is bent at right angles to the portion 17 to form a circular rim-flange 18, which extends across the radial center line of the wheel, to the extreme opposite side of the construction.

The outer disk 2 is caused to slant outwardly as shown at 19, in the same manner as the inwardly slanting portion 16 of disk 1, the disk 2 then again proceeding in the radial direction as indicated at 20, in the same manner as is indicated for the disk 1 at 17. The disk 2 then extends in the axial direction as shown at 21, parallel to the rim-flange 18. The circular flange 21 thus formed extends outwardly, in the same direction as the flange 18, to the extreme outer edge of the latter, the flange 21 then being bent in the radial direction to form a flange 22 which extends past the outer edge of flange 18, which latter may rest against the flange 22.

The parallel flanges 21 and 18 are secured together by a series of rivets 23. In the formation of the rear wheel now being described, however, angle pieces 24 and 25 are preferably inserted within flanges 17 and 18 and between the flanges 20, 21 and 18 to reinforce the construction at the corners thus formed, circular rows of rivets 26 preferably being used to secure angles 24 to the radial portion 17 of disk 1 and to the radial portion 20 of disk 2.

The felly band 27 is mounted on the rim-flange 18, this band preferably being shrunk on flange 18 so that it will be held thereon by friction. Preferably, however, as a precaution, every fifth one of the radially extending rivets 23 is extended through the felly-band 27. The radially extending flange 22 at the extreme outer edge of disk 2 extends beyond the edge of flange 18 forming a stop against which the edge of the felly-band may be mounted. The dual tires 28—28 are mounted in the usual fashion upon the felly-band 27. An additional reinforcement which is preferably used for the wheel consists in a flat metal member 29 which extends around the wheel, the inner end of this member being secured as by rivets 30 to the disk 1 adjacent the point at which the latter is bent inwardly, as is indicated at 16. The member 29 extends outwardly of the wheel from this point, at an inclination toward and beyond the plane of the main radial portion of the outer disk 2, the outer edge of member 29 being bent into parallel contacting relation with the flange 18 to which it is secured as by means of rivets 31.

It will be noted that the construction described provides an extremely strong and rigid structure which is at the same time light and readily manufactured. It will be noted that the load from both tires is transmitted by the various agencies noted to the inner disk 1 which in turn may be reinforced and supported by the large brake-drum 6. The wheel may be placed on the hub either side out, but in the case of the heavy wheel just described it is better that the same should be placed as shown in order to obtain the support of the brake-drum itself. Radial stresses on the outside tire 28 are transmitted to the inner disk 1 through the reinforcing strip 15 as well as through the diagonal reinforcement 29 and the other reinforcing and spacing members described. The rigidity of the structure is enhanced by the angle-members 24 and 25 disposed at the outside peripheral edges of the wheel as described.

The construction illustrated in Figs. 3 and 4 is adapted for a front wheel, as stated, and comprises some of the features described above. The disks 1' and 2' are of pressed steel or other suitable metal, bent around the hub, as indicated at 4' and 5', in the same manner as in the case of the construction already described. The hub itself is not illustrated in connection with this construction. It may be the same as or similar to the hub described and illustrated in connection with Figs. 1 and 2. In this case the inner-channel-shaped reinforcements 10' are used, similar to the reinforcements 10 described in connection with Figs. 1 and 2 and at some distance beyond the same, radially of the wheel, the channel strip 11' is secured between the disks, in the same manner as the channel strip 11 described in connection with Figs. 1 and 2. The disks 1' and 2' are provided with apertures 32 in a circular series, intermediate the reinforcements 10' and 11', and bolts similar to bolts 12 described in connection with Figs. 1 and 2 are adapted to be inserted through these openings and to extend through suitable radial flanges of the hub construction, similar to the flanges 9 and 7 illustrated in connection with Figs. 1 and 2.

The disks 1' and 2' extend in substantially parallel relation from the central openings, radially, to a point in alinement with the channel reinforcement 11', from which point they preferably slant inwardly of the wheel construction to some extent, as indicated at 33, the disks then being curved outwardly of the wheel adjacent their outer portions as is indicated at 34 and 35. The inner disk 1' is bent in the axial direction as shown at 18' from the curved portion 34, to form a rim-flange similar to the rim-flange 18 described in connection with Figs. 1 and 2 and the disk 2' is similarly bent in the axial direction as shown at 21', to form a flange similar to flange 21 described in connection with Figs. 1 and 2, this flange terminating in the radially directed flange 22' which extends around the outer edge of the flange 18' in the same manner as the flange 22 described in connection with Figs. 1 and 2. Similarly the rivets 23' secure the flanges 21' and 18' together, certain ones of these rivets, such as every fifth one, preferably also extending into the felly-band 27' which is preferably shrunk on the rim-flange 18'. The single tire 36 is carried by the felly band. It will be observed that this construction provides a considerable amount of rigidity together with a light and cheaply constructed structure, and that driving or other forces are transmitted from the hub bolts to the felly-band without the same being carried through any joints in the wheel construction. This wheel, as well as the rear wheel previously described is designed in such a way that the same may be placed on any hub of corresponding size which previously carried a wooden spoke wheel. The felly-bands shown in the above construction are intended for the standard solid tires which are forced on, but a felly-band suitable for demountable tires may be used when desired, without changing any of the wheel construction.

If desired, hooks may be secured to the wheels, for the attachment of anti-skid chains, and this feature is illustrated as applied to the rear wheel construction. The hooks 37, preferably of forged metal, are secured around the outer portions of the disks 1 and 2, as by arc-welding a suitable number of the same to the slanting portions 16 and 19 of the disks adjacent the outer edges of said slanting portions. Six to eight hooks on each side will usually be a suitable number.

What I claim is:

1. In a wheel, the combination of a pair of pressed metal disks in spaced relation having a central hub opening therethrough, the outer portion of one disk being bent past the main portion of the second disk to form a rim flange and the outer portion of the second disk being bent into parallel relation with the adjacent edge portion of said flange, the portions of said disks adjacent said opening being arched inwardly, angle pieces secured within the first disk at the angle between the radial and rim flange portions thereof and within the second disk and between the rim flange and the portion of said second disk parallel thereto, respectively, bolts securing said flanges and angle pieces together, a cylindrical reinforcement of curved channel cross-section positioned within said inwardly arched portions of the disks, means for securing said disks together, and a felly band mounted on the rim flange.

2. In a wheel, the combination of a hub member having a central portion and separated radially-extending portions, a pair of pressed metal disks having a central opening through which said central portion of the hub member extends with said radially-extending portions of the hub member contacting against the outer faces of said disks adjacent said central hub portion, said disks having arched hub flanges contacting against said hub member, one of said disks having a rim flange and the other having an outer flange engaging and secured to the outer edge portion of said rim flange, bolts extending through said radially-extending hub portions and disks, adjacent said hub flanges, channeled spacing reinforcements between said disks on both the inner and outer sides of said bolts, radially of the disks, and a felly band on said rim flange.

3. In a wheel, the combination of a pair of metal disks arranged in spaced relation, one of the same having its peripheral portion bent parallel to the axis of the wheel past the main portion of the second disk to form a rim flange, and said second disk having a shorter length of its peripheral portion bent into parallel contacting relation with the edge portion of said flange, said disks having a central hub opening, said disks being parallel throughout their inner portions, thence extending inwardly and outwardly, respectively, and then again radially to their peripheral bent portions, spacing and reinforcing means interposed between the parallel inner portions of said disks adjacent said opening, bolts for securing said disks to a hub, extending through said disks adjacent said opening, means for securing the bent contacting edge portions of said disks together, and a felly band mounted on the rim flange thus joined.

4. In a wheel, the combination of a hub member having an axial portion and a radially-extending flange portion, a brake-drum having a radially-extending web parallel to said flange portion, spaced therefrom and secured to said hub member, a pair of pressed metal disks having a central opening through which said axial portion of the hub member extends, with said flange portion and said brake-drum web contacting against the outer faces of said disks adjacent said axial hub portion, the inner disk being pressed at an angle inwardly past said drum, then radially, and then at right angles, outwardly, to form a rim flange, and the outer disk being correspondingly pressed at an angle outwardly, then radially, then at right angles outwardly into parallel relation to the edge portion of said rim flange, and secured thereto, bolts extending through said radially extending flange portion, said brake-drum web and said disks, and reinforcing spacing members interposed between said disks.

5. In a wheel, the combination of a pair of pressed metal disks having a central hub opening therethrough, said disks being parallel throughout their inner portions, thence extending inwardly and outwardly, respectively, and then again radially, the inner disk then being bent at right angles to form a rim flange, the outer disk being bent outwardly, from its outer radial portion, parallel to and within the outer edge of said rim flange, angle pieces secured within the outer radial and rim flange portion of said inner disk, and within the outer radial portion of said outer disk and between the rim flange and the portion of said outer disk parallel thereto, bolts securing said devices together, and reinforcing spacing members interposed between said disks.

6. In a wheel, the combination of a pair of pressed metal disks having a central hub opening therethrough, said disks being parallel throughout their inner portions, thence extending inwardly and outwardly, respectively, and then again radially, the inner disk then being bent at right angles to form a rim flange, and the outer disk being bent from its outer radial portion into parallel relation to the outer edge of said rim flange and secured thereto, bolts in inner and outer series extending through the inner radial portions of said disks, cylindrical spacers surrounding each of the bolts of the outer series, a spacing reinforcement surrounding the outer series of bolts, and spacing reinforcements inside and outside, radially, of the inner series of bolts.

7. In a wheel, the combination of a hub member, a brake-drum secured thereto, a pair of disks having a central opening through which said hub member extends, and having arched hub flanges contacting against said hub member, the inner disk contacting against said drum for a portion of its radial distance from said hub member, and said outer disk being parallel thereto for a like portion, said inner and outer disks being bent inwardly and outwardly, respectively, beyond said drum, and then bent to form a rim flange, bolts in inner and outer series extending through said inner parallel portions of said disks, cylindrical spacers surrounding each of the bolts of the outer series, a spacing reinforcement immediately surrounding the outer series of bolts, a spacer adjacent the inner series of bolts, and a member running entirely around the construction, extending from a point on the inner disk, adjacent said outer bolts, diagonally outwardly to said rim flange.

8. In a wheel, the combination of a pair of pressed metal disks having a central hub opening therethrough, said disks having their peripheral portions bent parallel to the axis of the wheel to form a rim flange, said disks having inner radial portions with arched hub flanges about said opening, bolts in inner and outer series extending through said inner radial portions, spacing reinforcements adjacent the inner series of bolts, and a spacing reinforcement surrounding the outer series of bolts.

9. In a wheel, the combination of a pair of pressed metal disks having a central hub opening therethrough, said disks having their peripheral portions bent parallel to the axis of the wheel to form a rim flange, said disks having inner radial portions with arched hub flanges about said opening, bolts extending through said inner radial portions, spacing reinforcements adjacent said bolts, and a member running entirely around the construction, extending from a point on the inner radial portion of one disk, diagonally outwardly to said rim flange.

This specification signed and witnessed this 31st day of January, 1919.

ALBERT LESLIE LAMBERT.

Witness:
WILLIAM J. EARNSHAW.